United States Patent [19]

Ofner et al.

[11] Patent Number: 5,690,077
[45] Date of Patent: Nov. 25, 1997

[54] INJECTION SYSTEM FOR AN INTERNAL COMBUSTION ENGINE

[75] Inventors: Herwig Ofner, Stübing; Peter Herzog, Graz, both of Austria

[73] Assignee: AVL Gesellschaft für Verbrennungskraftmaschinen und Messtechnik m.b.H., Graz, Austria

[21] Appl. No.: 620,570

[22] Filed: Mar. 22, 1996

[30] Foreign Application Priority Data

Mar. 23, 1995 [AT] Austria ..................... 518/95

[51] Int. Cl.$^6$ ..................... F02M 21/02
[52] U.S. Cl. ..................... 123/525; 123/27 GE
[58] Field of Search ..................... 123/525, 526, 123/527, 27 GE

[56] References Cited

U.S. PATENT DOCUMENTS

| | | | |
|---|---|---|---|
| 4,774,909 | 10/1988 | Dolderev | 123/527 |
| 5,163,409 | 11/1992 | Gustafson et al. | 123/527 |
| 5,375,580 | 12/1994 | Stolz et al. | 123/527 |
| 5,377,645 | 1/1995 | Moore | 123/525 |

FOREIGN PATENT DOCUMENTS

| | | | |
|---|---|---|---|
| 3204752 | 8/1983 | Germany | 123/527 |
| 35 23855 | 1/1987 | Germany . | |

OTHER PUBLICATIONS

"Gas–Powered IC Engine Fuel Feed System . . . " in Soviet Inventions Illustrated, Derwent, Jul. 11, 1984, Q 53.

*Primary Examiner*—Erick R. Solis
*Attorney, Agent, or Firm*—Watson Cole Stevens Davis, P.L.L.C.

[57] ABSTRACT

To provide an injection system for an internal combustion engine operating on self-igniting liquefied gas as a fuel, and to minimize cavitation and related problems of fuel delivery as well as wear, the fuel tank is configured as a low-pressure storage tank which is connected to a pressure control unit maintaining a constant interior pressure at a level above that of the vapor pressure of the liquefied gas, preferably at 6 to 30 bar, approximately, and further the injection system is configured as a leakage-free system.

10 Claims, 1 Drawing Sheet

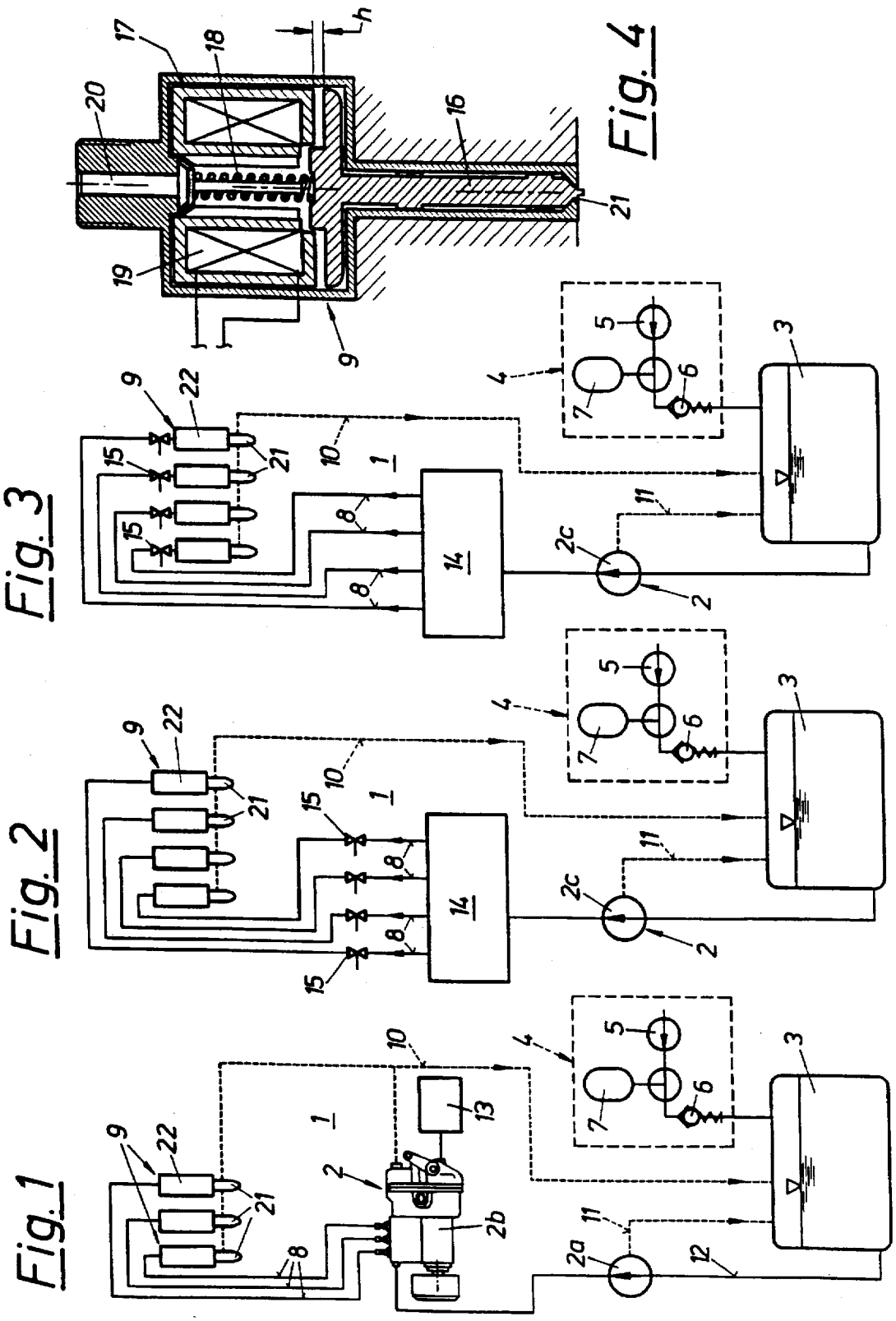

INJECTION SYSTEM FOR AN INTERNAL COMBUSTION ENGINE

BACKGROUND OF THE INVENTION

The present invention relates to an injection system for an internal combustion engine operating on self-igniting liquefied gas as a fuel, comprising an injection unit per cylinder for direct injection of the fuel into the combustion chamber, and a fuel tank, and a fuel delivery device for drawing the fuel from the fuel tank and delivering it to the injection unit.

Conventional injection systems are designed for injecting either self-igniting or extraneously ignited liquid fuels. At conditions of ambient pressure and ambient temperature, such fuels are provided in liquid form; as a consequence the storage tank is non-pressurized. Usually the liquid fuel is simultaneously employed as a lubricant for movable parts of the injection system. For this reason provisions are made for leakages and oil leakage pipes leading back to the tank.

DESCRIPTION OF THE PRIOR ART

In DE 35 23 855 A1 a method is described for operation of an internal combustion engine using a cracked gas obtained from methanol and air. Methanol is usually stored in depressurized condition in conventional storage tanks. The cracked gas, which is also known as synthetic gas, consists of hydrogen and carbon monoxide and is produced in a gas-producing unit at the pressure required for injection, which is in the range of 80–100 bar. The cracked gas is ignited either by a spark or another fuel with good ignition qualities, such as diesel. Cracked gas is not a self-igniting liquefied gas. It is not directly injected into the combustion chamber of the engine but blown in indirectly at high pressure. Such an injection system cannot be used for direct injection of a self-igniting liquefied gas in an internal combustion engine operating on liquefied gas.

Another known type of fuel used in this context is a liquefied gas stored under pressure. The Russian Abstract SU 1040-206-A (Soviet Inventions Illustrated, Q53, 1984) describes a gas-operated internal combustion engine with a fuel tank for liquefied gas, i.e., butane, which is pressurized with the use of another compressed gas, i.e., methane. Conventional liquefied gases such as propane or butane are fuels whose ignition is effected by outside means and which are introduced into the combustion chamber as gases premixed with air (fuels for use with Otto engines).

Newly developed liquid gas fuels with high cetane number, such as dimethyl ether, have a vapor pressure of less than 30 bar at ambient temperature and may be used as self-igniting fuels. If such liquid gases are used with conventional diesel injection systems, the danger of cavitation will arise on account of the high vapor pressure of such fuels, in particular in areas of a local pressure drop, which will lead to fuel delivery problems and increased wear.

Moreover, fuel-leakage from the system into the environment must be prevented by all means since the fuel evaporates under normal ambient conditions and could form an ignitible or explosive mixture together with air. The prevention of leakages is rendered difficult by the high permanent pressure that must be maintained in the system to keep the fuel in its liquid state.

SUMMARY OF THE INVENTION

It is an object of the invention to avoid these disadvantages and to provide an injection system for self-igniting liquefied fuel gases in which the danger of cavitation and wear is minimized and outside leakages are prevented.

In the invention this object is achieved by configuring the fuel tank as a low-pressure storage tank which is connected to a pressure control unit maintaining a constant interior pressure at a level above that of the vapor pressure of the liquefied gas, preferably at 6 to 30 bar, approximately, and by providing that the injection system be leakage-free. It is preferred that the pressure control unit be provided with a gas pumping unit, preferably for air or nitrogen, which is connected to the interior of the low-pressure storage tank by one or more check valves.

It is provided in a preferred variant that the leakage-free fuel delivery device include a leakage-free pump for fuel withdrawal and a leakage-free injection pump, the latter preferably being lubricated by an external lubricating system. The external lubricant may be simultaneously used as a sealing fluid for the liquefied gas.

According to another variant of the invention the leakage-free fuel delivery device is provided with a leakage-free high-pressure pump delivering the liquefied fuel gas from the low-pressure storage tank to a high-pressure tank from which high-pressure lines lead to the individual injection units, a preferably electromagnetically-operated control valve being provided in the flow path between the high-pressure tank and the nozzle of the injection unit. Such an injection system exhibits elements of previous storage tank injection systems, the novel feature being the use of a low-pressure storage tank in which the pressure level is maintained above vapor pressure by a pressure control unit. As the pressure of liquefied gas in the high-pressure tank need not exceed 200 bar, which is considerably less than would be required For diesel storage injection systems, a diaphragm pump may be employed as high-pressure pump.

Due to the lower absolute pressure level, the design of the control valves in the flow paths between the high-pressure tank and the nozzles may be kept simpler than that of control valves in diesel injection systems, or a different operating principle may be used altogether, e.g., actuation via a step motor.

It is provided in a preferred variant that the control valve be integrated in the injection unit.

Special preference is given to a variant in which the electromagnetically operated control valve directly actuates the fuel needle. The comparatively low injection pressure of 200 bar will permit direct opening of the fuel needle by means of a solenoid.

The injection unit is preferably configured without oil leakage lines, i.e., it should only have a single connecting line whose flow is regulated by the control valve. The spring-loaded fuel needle is directly lifted against the force of the spring by the fuel pressure prevailing in the valve space, like in conventional injection systems.

If existing engines are to be refitted with the new fuel injection system for liquefied gas it is recommended that the components low-pressure storage tank, high-pressure pump (diaphragm pump) and high-pressure tank be configured as a compact unit which can be attached to the existing engine.

BRIEF DESCRIPTION OF THE DRAWINGS

The invention will be further described with reference to the accompanying drawings, in which FIGS. 1–3 show different variants of injection systems as described by the invention for self-igniting liquefied fuel gases, FIG. 4 shows a detail of another variant with an injection unit including an electromagnetically operated fuel needle.

DETAILED DESCRIPTION OF PREFERRED EMBODIMENTS

FIG. 1 shows an injection system 1 according to the invention, for direct injection of liquefied gas, whose fuel delivery device 2 includes a fuel withdrawal pump 2a and an injection pump 2b which may be configured as a series injection pump or a distributor injection pump or the like. The liquefied fuel gas is stored in a low-pressure storage tank 3. Via a pressure control unit 4, the pressure inside the low-pressure storage tank 3 is maintained above the vapor pressure of the liquefied gas. The pressure in the low-pressure tank is 6 to 30 bar, approximately. The pressure control unit 4 is provided with a gas pumping unit 5 delivering air or nitrogen into the interior of the low-pressure tank via a check valve 6. If necessary, a pressure vessel 7 could be arranged between gas pumping unit 5 and low-pressure storage tank 3. Like in conventional injection systems, the injection pump 2b is supplied with fuel by the fuel withdrawal pump 2a. Via high-pressure lines 8 the injection pump 2b delivers the liquefied gas to the individual injection units 9. It would also be possible to combine the injection pump 2b and the injection units 9 into pump-nozzle elements. Each injection unit 9 comprises a nozzle 21 and a nozzle holder 22. If desirable, leakage lines 10 and 11 leading to the low-pressure tank may be provided. In this instance care must be taken that the system pressure will not fall below the vapor pressure in any part of the injection system 1, above all in the suction lines 12 and the leakage lines 10, 11. The aggregate units of the injection system, i.e., the fuel withdrawal pump 2a, the injection pump 2b, and the injection unit 9 must be designed so as to prevent any leakages to the outside. If these elements can be configured in such a way that no low-pressure level is required for operation, the leakage lines 10 and 11, which are indicated in the drawing by broken lines, become superfluous. The injection pump 2b may be lubricated by an external lubricating system bearing the reference number 13. The lubricant is simultaneously used as a sealing fluid for the liquefied gas.

As a contrast to FIG. 1, FIGS. 2 and 3 show storage injection systems in which the liquefied gas is delivered from the low-pressure storage tank 3 to a high-pressure tank 14 by means of a leakage-free high-pressure pump 2c. The pressure in the high-pressure tank 14 may amount to 200 bar, for example. Because of the properties of the liquefied gases used in this context, there will be no need for higher pressures generally. The leakage-free diaphragm pump 2c is controlled either via pressure limiting or via the pump lift. In the high-pressure lines 8 leading from the high-pressure tank 14 to the injection units 9 solenoid valves 15 are provided which are actuated by means of a control unit not shown here in detail. As is shown in FIG. 3, the valves 15 could also be integrated in the injection units 9.

Due to the moderate injection pressure of 200 bar for liquefied fuel gas, which is low compared to conventional storage tank injection systems for diesel fuels, the fuel needle 16 of the injection valve 9 may be directly operated by the magnetic force of a solenoid 17 against the force of a spring 18, since the dimensions of the spring may be kept relatively small. The coil of the solenoid 17 is referred to as 19, while 20 denotes the fuel connection of the injection unit 9. If the fuel needle 16 is configured as a pintle-type nozzle, rate shaping may be achieved via variable flow regulation during the needle lift h.

We claim:

1. Injection system for an internal combustion engine operating on self-igniting liquefied gas as a fuel, comprising an injection unit per cylinder for direct injection of the fuel into a combustion chamber, a fuel tank, a fuel delivery device for drawing fuel comprising self-igniting liquefied gas from said fuel tank and delivering said fuel to said injection unit, said fuel tank being configured as a low-pressure storage tank, and a pressure control unit connected to said storage tank for maintaining a constant interior pressure within said storage tank at a level above the vapor pressure of said liquefied gas, said pressure control unit including a gas pumping unit which is connected to an interior of said storage tank via at least one check valve, and wherein the injection system is leakage-free.

2. Injection system according to claim 1, wherein said gas pumping unit delivers to the interior of said storage tank gas selected from the group consisting of air and nitrogen.

3. Injection system according to claim 1, wherein said leakage-free fuel delivery device includes a leakage-free pump for fuel withdrawal and a leakage-free injection pump.

4. Injection system according to claim 3, wherein said injection pump is lubricated by an external lubricating system.

5. Injection system according to claim 1, wherein said leakage-free fuel delivery device is provided with a leakage-free high-pressure pump delivering said liquefied fuel gas from said low-pressure storage tank to a high-pressure tank, and including a control valve in a flow path between said high-pressure tank and a nozzle of the injection unit.

6. Injection system according to claim 5, wherein said high-pressure pump is a diaphragm pump.

7. Injection system according to claim 5, wherein said control valve is integrated in said injection unit.

8. Injection system according to claim 7, wherein said control valve is electromagnetically operated and directly actuates a fuel needle of said injection unit.

9. Injection system according to claim 1, wherein said injection unit is configured leakage-free.

10. Injection system according to claim 1, wherein the components low-pressure storage tank, high-pressure pump and high-pressure tank are configured as a compact unit.

* * * * *